United States Patent Office 3,675,995
Patented July 11, 1972

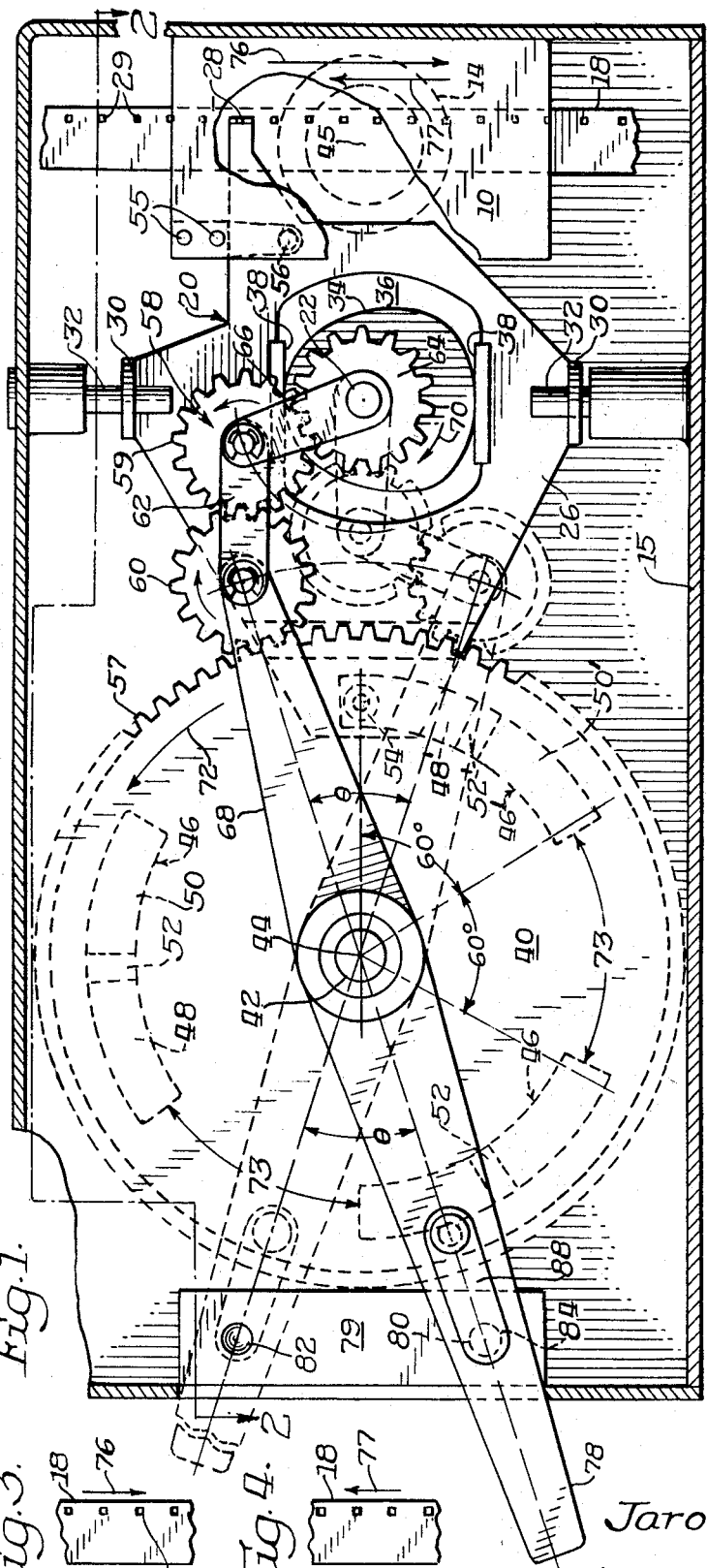

3,675,995
REVERSING MECHANISM FOR MOTION
PICTURE PROJECTORS
Jaroslav Cherniavsky, Skokie, Ill., assignor to Bell &
Howell Company, Chicago, Ill.
Continuation of abandoned application Ser. No. 765,265,
Oct. 4, 1968. This application May 21, 1971, Ser. No.
141,346
Int. Cl. G03b 1/18
U.S. Cl. 352—173                                15 Claims

ABSTRACT OF THE DISCLOSURE

A reversing mechanism for an intermittent pull-down motion picture projector changes the phase relationship between the up-and-down and in-and-out cams of the projector by 180° to reverse the direction of movement of the film without stopping the prime mover of the projector. The mechanism achieves the required phase change by shifting the point of contact of the driving gear, that connects the cams in timed operating relationship with the prime mover, along an arc concentric with the axis of the in-and-out cam and through an angle equal to 180° divided by the ratio of the frequency of rotation of the up-and-down cam to the frequency of the in-and-out cam.

---

This is a continuation of Ser. No. 765,265, filed Oct. 4, 1968, and now abandoned.

This invention relates to motion picture projectors, and more particularly to a reversible, film-feeding mechanism for a motion picture projector.

In motion picture projectors where the film is intermittently advanced past an aperture for the successive projection of images on the film, it is desirable to provide means for quickly and easily reversing the direction of transport of the film.

Reversible, film-feeding mechanisms that have been provided in the past have not proven entirely satisfactory. Such mechanisms, for example, can only be safely operated without causing damage to the mechanism or the film, when the projector drive mechanism is stopped or is operating at a very slow speed. Further, to effect reverse operation these mechanisms require a reversal in the direction of rotation of operating parts, a clutching mechanism, or a means for disengaging and re-engaging operating parts, all of which have the inherent disadvantage of disturbing the synchronization of the projector.

Accordingly, a primary object of this invention is to provide a new and improved film-feeding mechanism for a motion picture projector that can be readily reversed without stopping or changing the direction of motion of the prime mover of the projector and without disturbing its synchronization.

This invention provides a motion picture projector which intermittently advances a motion picture film past a projection aperture for the successive projection of images on the film and comprises a drive means, a shuttle tooth, and means for mounting the shuttle tooth for in-and-out and up-and-down movement relative to the projection aperture to intermittently engage and advance the film past the aperture.

An up-and-down cam is provided that is driven by the drive means to move the tooth up and down relative to the projection aperture at a given frequency.

In-and-out means are further provided for moving the tooth in and out in timed relationship with its up-and-down movement to effect intermittent advancement of the film. The in-and-out means includes an in-and-out cam which has a plurality of in-and-out cam surfaces on its face, and which is rotatably mounted on an axis substantially parallel to the optical axis of the projection aperture. The cam surfaces are equally spaced on a circle that is concentric with the axis of the cam. The in-and-out means also includes an in-and-out cam follower that transmits motion to the shuttle tooth to move it into and out of engagement with the film in response to rotation of the in-and-out cam.

Rotating means are also provided for rotating the in-and-out cam in synchronism with the up-and-down cam, including in-and-out cam gear means on the in-and-out cam, and drive gear means driven by the drive means.

In accordance with this invention, reversing means are provided for shifting the phase relation between the up-and-down and in-and-out cams by 180° to reverse the direction of movement of the film past the projection aperture. The reversing means includes: (1) connecting gear means operably interconnecting the in-and-out cam gear means with the drive gear means, and (2) means for moving the point of contact between the connecting gear means and the in-and-out cam gear means, without disengagement of any of said gear means, along an arc concentric with the axis of the in-and-out cam and through an angle equal to 180° divided by the ratio of the frequency of rotation of the up-and-down cam to the frequency of rotation of the in-and-out cam.

It is to be understood that both the foregoing general description and the following detailed description are exemplary and explanatory but are not restrictive of the invention.

The accompanying drawings, which are incorporated in and constitute a part of this specification, illustrate an embodiment of the invention, and together with the description serve to explain the principles of the invention.

Of the drawings:

FIG. 1 is an elevational view showing the reversible, intermittent film-feeding mechanism of this invention in a motion picture projector;

FIG. 2 is a top sectional view taken along the line 2—2 of FIG. 1; and

FIGS. 3 and 4 illustrate schematically the movement of the shuttle tooth of the film-feeding mechanism to transport the film in either a forward or reverse direction.

Reference will now be made in detail to the present preferred embodiment of the invention, an example of which is illustrated in the accompanying drawings.

For the purposes of clarity and simplification, only those parts of an intermittent film-feeding mechanism for a motion picture projector which are essential to an understanding of the reversing mechanism of this invention have been illustrated in the drawings.

With reference to FIGS. 1 and 2, the motion picture projector includes a film gate 10 having an aperture 12, a lamp 14 located behind film gate 10, and a lens 16 located ahead of the film gate. A perforated motion picture film 18 is intermittently advanced through film gate 10 by a film-feeding, pull-down mechanism generally indicated as 20. As each frame on the film is moved into alignment with aperture 12 in the gate by the pull-down mechanism, the frame is illuminated by lamp 14 and projected by lens 16 onto a screen (not shown).

The motion picture projector is driven through a drive shaft 22 that is connected to a suitable unidirectional and constant source of power, such as an electrical motor (not shown). Drive shaft 22 is rotatably supported by a bearing 23 mounted in a supporting wall 15 forming a part of the projector. A sector shutter 24 is connected to drive shaft 22 to intercept the light beam from lamp 14 at the frequency of rotation of the drive shaft and in synchronism with pull-down mechnsm 20 so that the light beam is cut off by sector shutter 24 only as the film is being advanced past aperture 12, as is well known to those skilled in the art.

As shown in FIG. 1, intermittent pull-down mechanism 20 includes a shuttle plate 26 and a shuttle tooth 28 for engaging perforations 29 in the film 18 to be moved through the projector. Shuttle plate 26 is mounted to move up and down and pivot relative to film gate 10 by having brackets 30 mounted for rotational and slidable movement on a pair of spaced pins 32 supported by the walls 15 of the projector. Shuttle plate 26 will thus reciprocate up and down on pins 32 to effect film advance and will pivot about these pins to move shuttle tooth 28 into and out of engagement with the perforations in the film.

In accordance with this invention, means are provided for reciprocating shuttle plate 26 and its attached tooth 28 up and down relative to aperture 12 in film gate 10. As embodied, this means comprises an up-and-down eccentric cam 34 fixed to drive shaft 22 and extending into an opening 36 in shuttle plate 26. As shown in FIG. 1, up-and-down cam 34 is embraced by a pair of follower plates 38 that are fixed to shuttle plate 26 at opposite ends of opening 36. Thus, each revolution of drive shaft 22 and attached up-and-down cam 34 will produce one complete reciprocal stroke of shuttle tooth 28, and hence the shuttle tooth will move at a frequency equal to the frequency of rotation of the drive shaft.

In accordance with this invention, means are also provided for moving shuttle tooth 28 into and out of engagement with the perforations in film 18 in selected timed relationship to its up-and-down movement. As embodied, this means includes an in-and-out cam 40 rotatably mounted on a shaft 42, that is fixed to the wall 15 of the projector, and about an axis 44 substantially parallel to drive shaft 22 and the optical axis 45 of the projector.

As shown in FIGS. 1 and 2, in-and-out cam 40 has a plurality of cam surfaces 46 on one face that are equally spaced around the face of the cam on a circle concentric with axis 44 of the cam. Cam surfaces 46 have tapered leading and trailing edges 48 and 50, respectively, joined by raised flat surfaces 52 that, in combination, form a series of concentric in-and-out cams to control the in-and-out movement of shuttle tooth 28. A cam follower 54 is provided on one end of shuttle plate 26 that is pressed against the face of in-and-out cam 40 and cam surfaces 46 by the action of a leaf spring 56 fixed to film gate 10 at 55.

Thus, it can be seen that as in-and-out cam 40 is rotated about axis 44, in-and-out movement is transmitted to shuttle tooth 28 from the in-and-out cam by cam follower 54 riding up and down cam surfaces 46 and by shuttle plate 26 pivoting about pins 32.

In accordance with this invention, means are provided for rotating in-and-out cam 40 in synchronism or selected timed relationship with up-and-down cam 34. As embodied, this means includes gear means on the in-and-out cam, such as gear teeth 57, spaced around the periphery of in-and-out cam 40 and drive gear means, such as a drive pinion 64, fixed to drive shaft 22.

In the embodiment illustrated and as best seen in FIG. 1, connecting gear means, generally indicated as 58, are further provided connecting in-an-out cam gear 57 with drive pinion 64 to rotate in-and-out cam 40 at a given frequency relative to the frequency of up-and-down cam 34, and thereby accomplish the proper in-and-out and up-and-down movements of shuttle tooth 28.

Connecting gear means 58 includes a pair of first and second pinions 59 and 60. As shown in FIG. 1, first pinion 59 is driven by drive pinion 64 and is held in operating engagement with pinion 64 by a link 66. Second pinion 60 is in turn held in operating engagement with pinion 59 by a link 62 and with gear teeth 57 on in-and-out cam 40 by a link 68. Links 66, 62, and 68 are pivotal about the axes of rotation of the pinions and cam 40 to permit pinions 59 and 60 to shift, without disengagement, relative to the fixed axes of rotation of drive pinion 64 and cam 40. The shifting of pinions 59 and 60 will be more fully described below in connection with the description of the reversing mechanism of this invention.

It can be seen, therefore, that rotary motion from drive shaft 22 is transmitted to in-and-out cam 40 through pinions 64, 59, and 60.

In the embodiment illustrated in the drawings, pinions 59 and 60 are the same size as drive pinion 64 and the reduction in gear ratio between drive pinion 64 and gear 57 on in-and-out cam 40 is 6 to 1. Thus, for every revolution of drive pinion 64 and attached up-and-down cam 34, in-and-out cam 40 is rotated ⅙ of a revolution or through a 60° arc.

This embodiment has three cam surfaces 46 on the face of in-and-out cam 40, each of which extends from near the beginning of its leading edge 48 to near the end of its trailing edge 50 through an arc of about 60°. The cam surfaces are separated from each other by a flat area 73 on the face of the cam that also extends through an arc of about 60°.

In operation of the pull-down mechanism 20 shown in FIG. 1, and with connecting pinions 59 and 60 in the position shown in solid lines, unidirectional rotary motion is imparted to drive shaft 22 to rotate up-and-down cam 34 and drive pinion 64 in the direction of arrow 70. While up-and-down cam 34 can be rotated at any speed, a speed of 54 revolutions per second is conventional and will be used for purposes of illustration in connection with this description of operation of the projector. At this speed, shuttle plate 26 and shuttle tooth 28 will reciprocate up and down at a rate of 54 strokes per second.

Rotary motion is transmitted from drive pinion 64 through connecting pinions 59 and 60 to gear 57 on in-and-out cam 40 so that cam 40 rotates in the direction of arrow 72 at ⅙ the speed of up-and-down cam 34.

Assuming the operating parts of the pull-down mechanism are in the position shown in FIGS. 1 and 2, with up-and-down cam 34 and tooth 28 at their downwardmost position, and tooth 28 out of engagement with film 18, it can be seen that in-and-out cam follower 54 is just beginning to ascend the leading edge 48' of one of the cam surfaces 46'.

After up-and-down cam 34 has rotated through 180° in the direction of arrow 70 so that shuttle tooth 28 will now be at its upwardmost position, such movement will have rotated in-and-out cam 40 through 30°. Hence, cam follower 54 will have ridden up leading edge 48' and be atop flat 52' of cam surface 46'. This movement of cam follower 54 will rotate shuttle plate 26 about pins 32 and against the urging of spring 56, so that shuttle tooth 28 will have moved into engagement with a perforation 29 in film 18.

The surface of eccentric up-and-down cam 34 is shaped so that shuttle tooth 28 has a dwell time at both its upper and lowermost positions, but quickly reciprocates when the sides of the cam engage cam followers 38. Hence, cam 34 and tooth 28 reach their uppermost position before the height of the leading edges 48 of cam surfaces 46 are high enough to move shuttle tooth 28 into a perforation in the film, and cam 34 and tooth 28 remain in their uppermost position long enough for the tooth to be moved into the perforation to prevent damage to the film.

After up-and-down cam 34 is rotated through its next 180°, at which time cam follower 54 simultaneously begins to descend trailing edge 50' of cam surface 46', shuttle tooth 28 remains engaged with and pulls the film down in the direction of arrow 76, one frame.

Similarly, cam 34 is constructed so that it reaches its lowermost position before the height of the trailing edges 50 of cam surfaces 46 are low enough to permit the tooth to be moved out of the film by spring 56, and cam 34 and tooth 28 remain in their lowermost position long enough for the tooth to be moved out of the film to prevent damage to the film.

The above described sequence of steps is repeated continuously to intermittently advance the film past the projection aperture.

Since in the embodiment illustrated in FIG. 1, there are three cam surfaces 46 spaced by flat areas 73 on in-and-out cam 40, shuttle tooth 28 will, through the next 360° of revolution of up-and-down cam 34, reciprocate up and down, but not in and out. Hence, while tooth 28 will reciprocate up and down for every revolution of drive shaft 22, it only will move in and out for every other revolution. With the drive shaft operating at 54 revolutions per second, the film will thus be advanced past aperture 12 at one-half this speed, or at a rate of 27 frames per second.

While three cam surfaces are shown in the embodiment of FIG. 1, it will readily be appreciated by those skilled in the art that any number of cam surfaces can be provided on the face of in-and-out cam 40 to achieve the desired film speed. For example, six cam surfaces, equally spaced around the circumference of in-and-out cam 40, would produce an in-and-out stroke of the shuttle tooth for each revolution of the up-and-down cam and advance the film at the rate of 54 frames per second. On the other hand, only one cam surface could be provided so that the tooth would move in and out only once for every six revolutions of the up-and-down cam. It will also be appreciated by those skilled in the art that the gear ratio between drive pinion 64 and in-and-out cam 40 can also be varied to obtain the desired film speed.

Thus, the number of cam surfacs on in-and-out cam 40 or the gear ratio can be varied without departing from the scope of the invention.

FIG. 3 illustrates schematically the combined up-and-down and in-and-out movements of the shuttle tooth to advance the film in the direction of arrow 76. Starting at the upper lefthand corner of FIG. 3, for example, the shuttle tooth, while at its uppermost position, is first moved into engagement with the film, and then pulled down while in engagement with the film, thereby advancing the film one frame in the direction of arrow 76. The tooth is disengaged while at its lowermost position and then moved back to its starting position while out of engagement and the sequence of steps is continuously repeated to intermittently advance the film.

In accordance with this invention, a reversing mechanism is provided for reversing the direction of transport of the film that is simple and reliable in operation and that can be operated without stopping the drive mechanism of the projector; without reversing the direction of rotation of any of the operating parts; and without disturbing the proper synchronization of the projector.

The reversing mechanism of this invention comprises reversing means for shifting the phase relation between the up-and-down and in-and-out cams by 180° so that the in-and-out cam which has previously been forcing the tooth into engagement with the film just prior to the start of its downward stroke and withdrawing it from the film just after the end of its downward stroke, will now force the tooth into engagement just prior to the start of its upward stroke and withdraw it just after the end of its upward stroke, thereby advancing the film in the reverse direction, as shown by arrow 77.

In accordance with this invention, the reversing means includes the connecting gear means that operably connects the in-and-out cam gear means with the drive gear means but is shiftable relative to the axes of rotation of these gear means; and means for moving the point of contact of the connecting gear means with the in-and-out cam gear means, without disengagement of any of the gear means, along an arc concentric with the axis of the in-and-out cam and through an angle $\theta$ equal to 180° divided by the ratio of the frequency of rotation of the up-and-down cam to the frequency of rotation of the in-and-out cam.

As embodied in FIG. 1, the means for moving the point of contact between pinion 60 of connecting gear means 58 and cam gear 57, comprises a reversing lever 78 that is integrally connected to link 68 to swing link 68 and pinion 60 through the angle $\theta$ on an arc concentric with the axis 44 of in-and-out cam 40. As shown by the solid and phantom lines of FIG. 1, lever 78 swings between two operating positions; in one position it causes the film to move forward; in the other position it causes the film to move in a reverse direction. A bracket 79 on projector wall 15 is provided with detents 80 and 82 at the two operating positions of the lever. A ball 84 is captured in an aperture 86 in the end of reversing lever 78 and is biased into engagement with the detents 80 and 82 by a leaf spring 88 to accurately position the lever at its two operating positions.

Movable links 66 and 62 of connecting gear means 58 permit lever 78 to shift the point of contact between pinion 60 and in-and-out cam gear 57 through the angle $\theta$, without disengagement of these gears. The positions of the pinions 59 and 60 in the two operating positions are shown in solid and phantom lines in FIG. 1.

Operation of the reversing mechanism of this invention can best be explained with the projector in operation and the film being advanced in the direction of arrow 76. Thus, with a 6 to 1 gear ratio, in-and-out cam 40 will rotate 1/6 of a revolution or through 60° for every revolution of up-and-down cam 34.

When lever 78 is raised to the position shown in phantom in FIG. 1, the point of engagement between pinion 60 and gear 57 on in-and-out cam 40 is shifted down an angle $\theta$ which, as defined above, is equal to 180° divided by the ratio of the frequency of rotation of the up-and-down cam to the frequency of rotation of the in-and-out cam.

Thus in the illustrated embodiment, $\theta$ equals 30° (180/6/1). Since pinion 60 rotates at a constant speed and 1/2 of a revolution of pinion 60 will rotate the in-and-out cam 30°, by wallking pinion 60 around gear 57 through 30° and against the direction of rotation 72 of cam 40, half a revolution of pinion 60 will be taken up in accomplishing this shift and will not be transmitted to the in-and-out cam. In other words, up-and-down cam 34 will rotate half a revolution or 180°, without a corresponding 30° rotation of in-and-out cam 40 during the time the lever is being shifted. Thus, up-and-down cam 34 will now be exactly 180° out of phase with in-and-out cam 40 and the shuttle tooth will move the film in the direction of arrow 77.

FIG. 4, in a manner similar to FIG. 3, illustrates schematically the combined up-and-down and in-and-out movements of the shuttle tooth to advance the film in the direction of arrow 77. Starting at the upper left-hand corner of FIG. 4, for example, the shuttle tooth, while at its uppermost position, is moved out of engagement with the film, and then pulled down to its lowermost position. While at its lowermost position, it is moved back into engagement with film and then moved up to its starting position to advance the film one frame in the direction of arow 77. The sequence of steps is continuously repeated to intermittently advance the film in this direction.

Thus, it can be seen that effective reversal of the direction of transport of the film can be achieved with the reversing mechanism of this invention without stopping the prime mover of the projector, and without disengaging or reversing the direction of rotation of the operating parts.

It will readily be apparent that a second reversal of the film can be accomplished by moving the shift lever back to its original position. When lever 78 is lowered to the position shown in solid lines in FIG. 1, pinion 60 is walked back up gear 57 on in-and-out cam 40 through 30° in the direction of rotation 72 of that cam. Since pinion gear 60 rotates at a constant speed, this shift will rotate in-and-out cam 40, 30° in addition to the rotation imparted to it by drive pinion 64. Thus, the up-and-down and in-and-out cams will again shift 180° and be back in their original relationship to again drive the film in the direction of arrow 76.

While an advantage of the reversing mechanism of this invention is that it permits reversal of the film without stopping the drive mechanism of the projector, it will readily be apparent to those skilled in the art that the device can also be operated with the machine at rest.

In this event, however, gear teeth 57 on in-and-out cam 40 become the prime mover of the gears rather than drive shaft 22 which has now been stopped. Thus, as reversing lever 78 is shifted to the phantom position, pinion 60 will walk down the surface of gear 57 through 30° and rotate one-half a revolution which, in turn, rotates up-and-down cam 34 one-half a revolution. Since cam 40 has not been rotated during this movement of lever 78, up-and-down cam 34 will be 180° out of phase with in-and-out cam 40 and the film will advance in the reverse direction.

When the lever 78 is again lowered to its original position, pinion 60 will rotate in the opposite direction which, in turn, will rotate up-and-down cam 34 back to its original position.

While the reversing mechanism of this invention has been shown in combination with a single rate pull-down mechanism, it will be appreciated by those skilled in the art that the reversing mechanism can also be used in combination with variable rate pull-down mechanisms that provide means for shifting in-and-out cam follower 54 radially of in-and-out cam 40 so that it can be engaged by different groups of varying numbers of cam surfaces.

The invention in its broader aspects is not limited to the specific details shown and described and departures may be made from such details without departing from the principles of the invention and without sacrificing its chief advantages.

What is claimed is:

1. A motion picture projector for intermittently advancing a motion picture film past a projection aperture for the successive projection of images on the film comprising in combination:
    (a) a shuttle tooth;
    (b) means for mounting the shuttle tooth for in-and-out and-up-and-down movement relative to the projection aperture to intermittently engage and advance the film past the aperture;
    (c) drive means operating at a given frequency;
    (d) an up-and-down cam driven by the drive means for moving said tooth up and down relative to the aperture at said given frequency;
    (e) means for moving said tooth in and out in timed relationship with its up-and-down movement, including:
        (1) an in-and-out cam rotatably mounted on an axis substantially parallel to the optical axis of the projection aperture,
        (2) at least one group of a plurality of in-and-out cam surfaces equally spaced on one face of the in-and-out cam on a circle concentric with the axis of the in-and-out cam,
        (3) an in-and-out cam follower for transmitting motion to the tooth to move it into and out of engagement with the film in response to rotation of the in-and-out cam, and
        (4) means for rotating the in-and-out cam in synchronism with the up-and-down cam including gear means on the in-and-out cam and drive gear means driven by the drive means; and
    (f) reversing means for shifting the phase relation between the up-and-down and in-and-out cams by 180° to reverse the direction of movement of the film past the aperture, including:
        (1) connecting gear means operably connecting the in-and-out cam gear means with the drive gear means, and
        (2) means for moving the point of contact between the connecting gear means and the in-and-out cam gear means, without disengagement of any of said gear means, along an arc concentric with the axis of the in-and-out cam and through an angle $\theta$ equal to 180° divided by the ratio of the frequency of rotation of the up-and-down cam to the frequency of rotation of the in-and-out cam.

2. The projector of claim 1, in which the connecting gear means includes a pair of first and second pinions that are shiftable without disengagement, relative to the fixed axes of rotation of the drive gear means and the in-and-out cam.

3. The projector of claim 2, in which the drive gear means comprises a drive pinion and the connecting gear means includes:
    (a) first linkage means rotatably supporting the first pinion in operable engagement with the drive pinion and permitting the first pinion to rotate about the axis of the drive pinion,
    (b) second linkage means rotatably supporting the second pinion in operable engagement with the first pinion and permitting the second pinion to rotate about the axis of the first pinion, and
    (c) third linkage means rotatably supporting the second pinion in operable engagement with the gear means on the in-and-out cam and permitting the second pinion to rotate about the axis of the in-and-out cam,
to thereby permit movement of the point of contact between the second pinion of the connecting gear means with the in-and-out cam gear means.

4. The device of claim 3, in which the frequency of rotation of the drive, first, and second pinions is equal to the frequency of rotation of the up-and-down cam.

5. The device of claim 1, wherein the ratio of the frequency of rotation of the up-and-down cam to the frequency of the rotation of the in-and-out cam is 6 to 1, and the angle $\theta$, through which the point of contact of the connecting gear means with the in-and-out cam gear means is moved to reverse the direction of movement of the film, is 30°.

6. The device of claim 3, wherein the means for moving the point of contact between the connecting gear means and the in-and-out cam gear means includes a control lever connected to the third linkage means, said lever being movable between two operating positions, so that movement of the lever between these two positions shifts the point of contact between the second pinion and the gear means on the in-and-out cam back and forth through the angle $\theta$.

7. The device of claim 6, wherein the third linkage means is swingable about the axis of the in-and-out cam and the control lever extends radially outward from the axis of the in-and-out cam in a direction opposite from the radial direction of the third linkage means.

8. The device of claim 6, which includes biasing means for frictionally holding the lever in its two operating positions.

9. The device of claim 8, in which the biasing means comprises detents on a fixed surface at the lever's two operating positions and a springloaded ball carried by said lever and moved into and out of engagement with the detents as the lever is moved between its two operating positions.

10. The device of claim 1, wherein the in-and-out cam gear means comprises a plurality of gear teeth spaced around the periphery of the cam.

11. In an intermittent pull-down motion pcture projector having a source of power, up-and-down and in-and-out cams, and planetary driving gear means that connects the cams in timed operating relationship with the source of power, reversing means for shifting the phase relation between the up-and-down and in-and-out cams by 180° to reverse the direction of movement of the film comprising means for moving the point of planetary gear contact of the planetary driving gear means with the in-and-out cam along an arc concentric with the axis of the in-and-out cam and through an angle $\theta$ equal to 180° divided by the ratio of the frequency of rotation of the up-and-down cam to the frequency of rotation of the in-and-out cam.

12. A motion picture projector for intermittently advancing a motion picture film past a projection aperture for the successive projection of images on the film comprising in combination:
   (a) a shuttle tooth;
   (b) means for mounting the shuttle tooth for in-and-out and up-and-down movement relative to the projection aperture to intermittently engage and advance the film past the aperture;
   (c) drive means operating at a given frequency;
   (d) means for moving said tooth up-and-down and in-and-out in timed relationship, including:
      (1) a first rotatably mounted cam,
      (2)) a second rotatably mounted cam powered by said drive means,
      (3) first cam follower means for transmitting motion to said tooth in response to rotation of said first cam,
      (4) second cam follower means for transmitting motion to said tooth in response to rotation of said second cam, and
      (5) means for rotating said first cam in synchronism with said second cam including first cam gear means for said first cam, drive gear means driven by said drive means, and connecting gear means operably connecting said first cam gear means with said drive gear means; and
   (e) reversing means for shifting the phase relation between said first and second cams by 180° to reverse the direction of movement of the film past the aperture, including:
      means for moving the point of contact between said connecting gear means and said first cam gear means, without disengagement of any of said gear means, through an angle determined by the ratio of the frequency of rotation of the second cam relative to the frequency of rotation of the first cam.

13. The invention defined in claim 12 wherein said reversing means moves said point of contact between said connecting gear means and said first cam gear means through an arc concentric with the axis of said first cam gear means.

14. A motion picture projector for intermittently advancing a motion picture film past a projection aperture for the successive projection of images on the film comprising in combination:
   (a) a shuttle tooth;
   (b) means for mounting the shuttle tooth for in-and-out and up-and-down movement relative to the projection aperture to intermittently engage and advance the film past the aperture;
   (c) drive means operating at a given frequency;
   (d) means for moving said tooth up-and-down and in-and-out in timed relationship, including:
      (1) a first rotatably mounted cam,
      (2) a second rotatably mounted cam powered by said drive means,
      (3) first cam follower means for transmitting motion to said tooth in response to rotation of said first cam,
      (4) second cam follower means for transmitting motion to said tooth in response to rotation of said second cam, and
      (5) means for rotating said first cam in synchronism with said second cam including first cam gear means for said first cam, drive gear means driven by said drive means, and connecting gear means operably connecting said first cam gear means with said drive gear means; and
   (e) reversing means for reversing the direction of movement of the film past the aperture, including:
      means for arcuately moving the point of contact between the connecting gear means and said first cam gear means, without disengagement of any of said gear means for shifting the phase relation between the first and second cams by 180°.

15. In an intermittent pull-down motion picture projector having a source of power, up-and-down and in-and-out cams, planetary driving gear means that connects the cams in timed operating relationship with the source of power, and reversing means for moving a point of contact of the planetary driving gear means relative to the cams for shifting the phase relation between the up-and-down and in-and-out cams by 180° to reverse the direction of movement of the film.

References Cited
UNITED STATES PATENTS

| | | | |
|---|---|---|---|
| 1,455,766 | 5/1923 | Portass | 352—83 |
| 2,911,849 | 11/1959 | Mitchell et al. | 74—472 |
| 3,261,654 | 7/1966 | Faber et al. | 352—173 X |
| 3,402,007 | 9/1968 | Gerlach | 352—169 X |
| 3,471,227 | 10/1969 | McClellan et al. | 352—173 X |
| 3,580,668 | 5/1971 | Claar | 352—173 X |

LOUIS R. PRINCE, Primary Examiner

J. W. ROSKOS, Assistant Examiner